(12) United States Patent
Heda et al.

(10) Patent No.: US 9,824,067 B2
(45) Date of Patent: Nov. 21, 2017

(54) SYSTEM AND METHOD FOR FORECASTING A TIME SERIES DATA

(71) Applicant: Tata Consultancy Services Limited, Mumbai, Maharashtra (IN)

(72) Inventors: Ashish Heda, Karnataka (IN); Rajeev Airani, Karnataka (IN); Avneet Saxena, Karnataka (IN)

(73) Assignee: Tata Consultancy Services Limited, Mumbai (IN)

( * ) Notice: Subject to any disclaimer, the term of this patent is extended or adjusted under 35 U.S.C. 154(b) by 573 days.

(21) Appl. No.: 14/531,647

(22) Filed: Nov. 3, 2014

(65) Prior Publication Data

US 2016/0034615 A1    Feb. 4, 2016

(30) Foreign Application Priority Data

Aug. 1, 2014    (IN) .......................... 2477/MUM/2014

(51) Int. Cl.
*G06F 17/18* (2006.01)

(52) U.S. Cl.
CPC .................................. *G06F 17/18* (2013.01)

(58) Field of Classification Search
CPC .................................................... G06F 17/5018
USPC ............................................................ 703/2
See application file for complete search history.

(56) References Cited

U.S. PATENT DOCUMENTS

| 6,594,622 | B2 | 7/2003 | Srivastava |
| 8,180,664 | B2 | 5/2012 | Shan |
| 2016/0364507 | A1* | 12/2016 | Dupuis ............... G06F 17/5009 |

FOREIGN PATENT DOCUMENTS

JP        2004295638 A      10/2004

OTHER PUBLICATIONS

Ying Chen, "Modeling and estimation for nonstationary time series with applications to robust risk management", Robust Risk Management, Jan. 18, 2011.

(Continued)

*Primary Examiner* — Andy Ho
(74) *Attorney, Agent, or Firm* — Shumaker, Loop & Kendrick, LLP

(57) ABSTRACT

Systems and methods for forecasting a time series data are disclosed. The methods include receiving a historical time-series data including a series data and a non-stationary series data. The historical time-series data is processed to obtain a unified time series data. On the unified time series data, a data distribution is plotted and the data distribution is validated based upon a rate function associated with a Large Deviation Theory (LDT). The unified time series data is split validated into vectors based on autocorrelation function (ACF). The unified time series data is further validated. A mixture of Gaussian distribution models is applied and weights are assigned to each of the Gaussian distribution model. By controlling the weights based upon various what-if scenarios, a resultant Gaussian time series data is generated. The resultant Gaussian time series data indicates forecasted time series data of the historical time series data.

7 Claims, 6 Drawing Sheets

(56) References Cited

OTHER PUBLICATIONS

Kjersti AAS, Xeni K. Dimakos, "Statistical modelling of financial time series: An introduction", Mar. 8, 2004.
Hyoung-Moon Kim, Bani K. Mallick and C. C. Holmes, "Analyzing nonstationary spatial data using piecewise Gaussian processes", Jan. 2012.
Yingjian Zhang, "Prediction of Financial Time Series with Hidden Markov Models", 2004 (Thesis).

* cited by examiner

SYSTEM AND METHOD FOR FORECASTING A TIME SERIES DATA

CROSS-REFERENCE TO RELATED APPLICATIONS AND PRIORITY

The present application claims priority from Indian Patent Application No. 2477/MUM/2014 filed on Aug. 1, 2014, the entirety of which is hereby incorporated by reference.

TECHNICAL FIELD

The present disclosure in general relates to forecasting a time series data. More particularly, the present disclosure relates to a system and method for forecasting non-stationary time series data with extreme values.

BACKGROUND

A time series is a sequence of values/observations/data points that are measured typically at successive points in time spaced at uniform time intervals. In other words, the values/observations/data points are observed at evenly spaced time intervals. Time series data may generally be used in pattern recognition, finance, weather forecasting, earthquake prediction, risk management, anomaly detection, tele-traffic prediction, etc. A time series may be stationary or non-stationary. A stationary time series is the time series data comprising a mean and a variance that are constant over time. In one example, yearly average of daily temperature readings in, for example, Mumbai may be considered as the stationary time series. Although temperature readings may vary from one day to another, the yearly averages may stay approximately the same. A non-stationary time series is the time series data comprising a mean and/or a variance that are not constant over time. For example, electrical demand in Mumbai may have a long-term trend as the demand may increase in response to growing population.

Several forecasting methods exists that attempt to predict future values of the time series data based on the past/historical time series data. For example, one of the forecasting methods includes continuing the trend curve smoothly by a straight line. In one example, the forecasting method may include Auto-Regression and Moving Averages (ARIMA). The ARIMA method assumes that each measurement in the time series data is generated by a linear combination of past measurements plus noise. Although the ARIMA is used extensively, the ARIMA method has proved to be inaccurate when used for non-stationary time series data.

In order to predict future values of the time series data, there is an increased thrust to model chaotic and/or turbulent data i.e. time series data that includes extreme values or large deviations. Generally, the time series data arising from risk management, weather predictions, anomaly detection, tele-traffic prediction, etc. includes the extreme values or the large deviations. For predicting future values of the time series data, traditionally most of the extreme values in the past/historical time series data are removed. The extreme values in the past/historical time series data are removed as they are considered to be outliers, and the known methods are applied on remaining time series data. At times, such extreme values may be treated as missing values and may be replaced by most likely values based on the other values. The replacement of the missing values with the most likely values may be referred to as missing value imputation.

Although proponents of such replacement/filtering of the values may be justifiable since the approach may capture the general information but there may be loss of information which might have been critical for future predictions. The criticality of the information may be noticed since the extreme values in essence captures the characteristics of a system that generates the time series data. For example, the extreme values in tele-traffic may occur and may comprise values that may be important and may need to be modelled for capacity planning.

On the other hand, traditional methods generally employ Extreme Value (EV) Distributions or mixture of distributions to capture the extreme values. The future values may be estimated by employing Expectation-maximization (EM), Maximum-Likelihood Estimation (MLE) or Bayesian methods. While employing the above methods, the extreme values are not removed from the time series data; instead the extreme values are utilized to build models without loss of any information. Further, in order to generate future forecasts either mixed or multiple data distributions are employed instead of using a single data distribution. In addition, for parameter estimation MLE, Bayesian or EM algorithm is applied. However, the methods discussed neither addresses the expected change or the rate of change in time series data. It is important to understand the rate of change of change in time series data. For example, in case of financial market data, it may be important to predict the expected future change in the market data. Further, most of the time series data involving the extreme values are generally non-stationary. Therefore, when the time series data is integrated, distributional assumptions related to Data Generating Process (DGP), for example mixture of Gaussians requires re-parameterization. If non-Gaussian distributions are employed then re-parameterization may get substantially complicated, for example text arrival in streaming data that is modelled as Dirichlet process. Further, existing methods do not provide both point and probability estimates of the forecasted value.

SUMMARY

This summary is provided to introduce concepts related to systems and methods for forecasting a time series data and the concepts are further described below in the detailed description. This summary is not intended to limit the scope of the claimed subject matter.

In one implementation, a method for forecasting a time series data is disclosed. The method includes receiving, by a processor, a historical time series data comprising a stationary series data and a non-stationary series data. The non-stationary series data indicates change in a mean and a variance of consecutive values of the historical time series data. The method further includes processing, by the processor, the stationary series data and the non-stationary series data to form a unified time series data. The processing includes converting the non-stationary series data into a differenced stationary series data. The non-stationary series data is converted by differencing the consecutive values of the non-stationary series data. The processing further includes combining the differenced stationary series data and the stationary series data in order to form the unified time series data. The method further includes plotting, by the processor, a data distribution for the unified time series data. The method further includes validating the data distribution of the unified time series data based upon a rate function. The rate function is associated with a Large Deviation Theory (LDT). The method further includes splitting, by the processor, the unified time series data into vectors based on an autocorrelation function (ACF). Each vector includes a set of values. The method further includes representing, by the processor, data distribution of each vector into a mixture of Gaussian distribution models. The method further includes assigning, by the processor, weights to each Gaussian distribution model using a Maximum Likelihood Estimation or Expectation Maximization (MLE/EM) algorithm. The weights are assigned based on mean values of the Gaussian mixture models. The method further includes generating, by the processor, a resultant Gaussian time series data. The resultant Gaussian time series data is modified/varied by controlling the weights. The resultant Gaussian time series data indicates forecasted time series data of the historical time series data.

In one implementation, a system for forecasting a time series data is disclosed. The system includes a processor and a memory coupled to the processor. The processor executes a plurality of modules stored in the memory. The plurality of modules includes a reception module to receive a historical time series data including a stationary series data and a non-stationary series data. The non-stationary series data indicates change in a mean and a variance of consecutive values of the historical time series data. The plurality of modules further includes a processing module to process the stationary series data and the non-stationary series data to form a unified time series data. The processing module further converts the non-stationary series data into a differenced stationary series data. The non-stationary series data is converted by differencing the consecutive values of the non-stationary series data. The processing module further combines the differenced stationary series data and the stationary series data in order to form the unified time series data. The plurality of modules further includes a validation module to plot a data distribution for the unified time series data. The validation module further validates the data distribution of the unified time series data based upon a rate function. The rate function is associated with a Large Deviation Theory (LDT). The plurality of modules further includes a splitting module to split the unified time series data into vectors based on an autocorrelation function (ACF). Each vector includes a set of values. The plurality of modules further includes an analyzing module to represent the data distribution of each vector into a mixture of Gaussian distribution models. The analyzing module further assigns weights to each Gaussian distribution model using a Maximum Likelihood Estimation or Expectation Maximization (MLE/EM) algorithm. The weights are assigned based on mean values of the Gaussian mixture models. The plurality of modules further includes a generating module to generate a resultant Gaussian time series data, wherein the resultant Gaussian time series data is modified/varied by controlling the weights. The resultant Gaussian time series data indicates forecasted time series data of the historical time series data.

In one implementation, a non-transitory computer readable medium embodying a program executable in a computing device for forecasting a time series data is disclosed. The program includes a program code for receiving a historical time series data comprising a stationary series data and a non-stationary series data. The non-stationary series data indicate change in a mean and a variance of consecutive values of the historical time series data. The program further includes a program code for processing the stationary series data and the non-stationary series data to form a unified time series data. The program code for processing further includes a program code for converting the non-stationary series data into a differenced stationary series data. The non-stationary series data is converted by differencing the consecutive values of the non-stationary series data. The program code for processing further includes a program code for combining the differenced stationary series data and the stationary series data in order to form the unified time series data. The program further includes a program code for plotting a data distribution for the unified time series data. The program further includes a program code for validating the data distribution of the unified time series data based upon a rate function. The rate function is associated with a Large Deviation Theory (LDT). The program further includes a program code for splitting the unified time series data into vectors based on an autocorrelation function (ACF), Each vector comprises a set of values, The program further includes a program code for representing data distribution of each vector into a mixture of Gaussian distribution models. The program further includes a program code for assigning weights to each Gaussian distribution model using a Maximum Likelihood Estimation or Expectation Maximization (MLE/EM) algorithm. The weights are assigned based on mean values of the Gaussian mixture models. The program further includes a program code for generating a resultant Gaussian time series data. The resultant Gaussian time series data is modified/varied by controlling the weights. The resultant Gaussian time series data indicates forecasted time series data of the historical time series data.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to refer like/similar features and components.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings. The present disclosure relates to systems and methods for forecasting a time series data. A historical time series data comprising a stationary series data and a non-stationary series data is received. The non-stationary series data indicates change in a mean and a variance of consecutive values of the historical time series data. The stationary series data and the non-stationary series data are processed to form a unified time series data. The processing comprises converting the non-stationary series data into a differenced stationary series data. The non-stationary series data is converted by differencing the consecutive values of the non-stationary series data. The processing comprises combining the differenced stationary series data and the stationary series data in order to form the unified time series data. For the unified time series data, a data distribution is plotted. The data distribution of the unified time series data is validated based upon a rate function. The rate function is associated with a Large Deviation Theory (LDT).

The unified time series data is split into vectors based on an autocorrelation function (ACF). Each vector comprises a set of values of the unified time series data. The data distribution of each vector may be represented as a mixture of Gaussian distribution models. Further, weights are assigned to each Gaussian distribution model using a Maximum Likelihood Estimation or Expectation Maximization (MLE/EM) algorithm. The weights are assigned based on mean values of the Gaussian mixture models. The representation and weights assignment may be repeated until an ideal what-if scenario is achieved. A resultant Gaussian time series data is generated. The resultant Gaussian time series data is modified/varied by controlling the weights. The resultant Gaussian time series data indicates forecasted time series data of the historical time series data.

While aspects of the described system and method for forecasting a time series data may be implemented in any number of different computing systems, environments, and/or configurations, the embodiments are described in the context of the following exemplary system.

Figure 1:
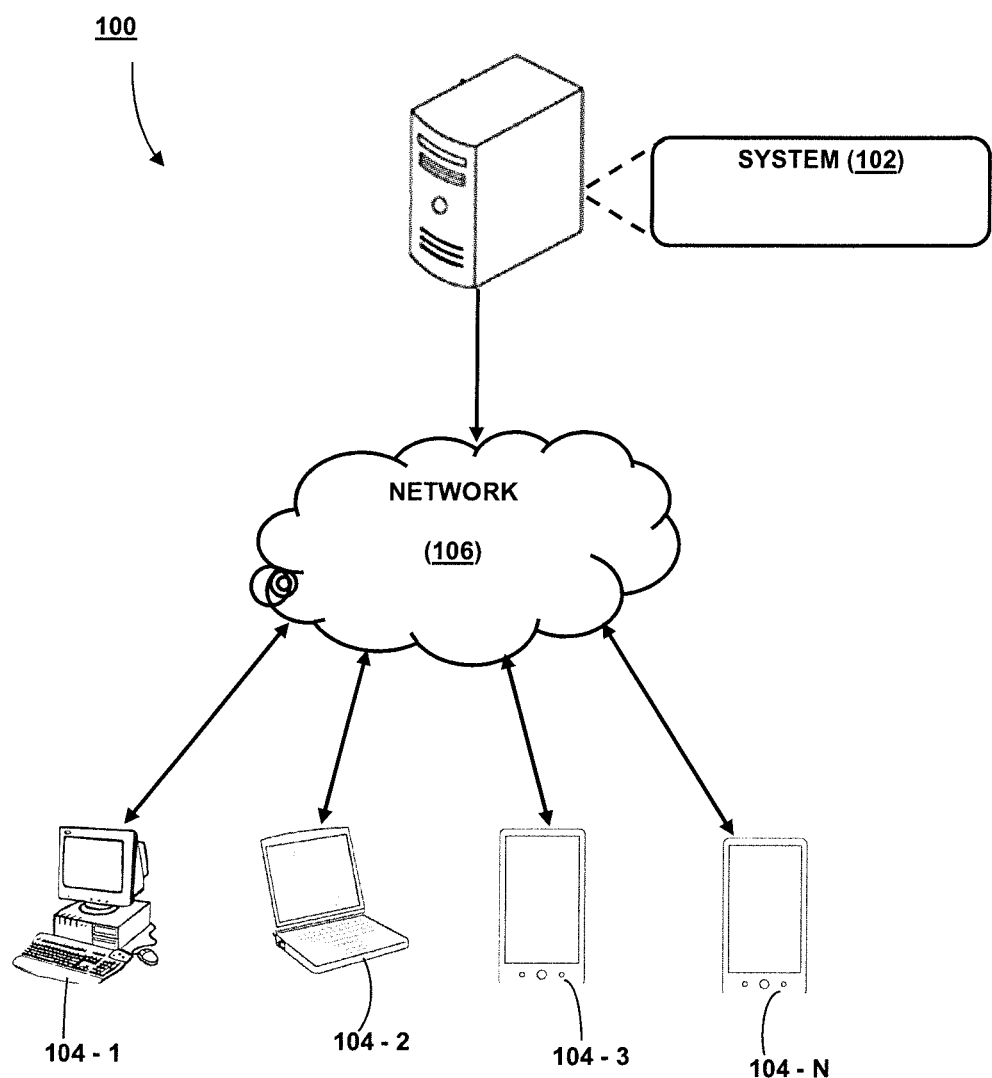
FIG. 1 illustrates a network implementation of a system for forecasting a time series data, in accordance with an embodiment of the present disclosure.

Referring now to FIG. 1, a network implementation 100 of a system 102 for forecasting a time series data is illustrated, in accordance with an embodiment of the present disclosure. The system 102 may receive a historical time series data comprising a stationary series data and a non-stationary series data. The system 102 may process the stationary series data and the non-stationary series data to form a unified time series data. In order to process the stationary series data and the non-stationary series data, the system 102 may convert the non-stationary series data into a differenced stationary series data. The non-stationary series data may be converted by differencing the consecutive values of the non-stationary series data. Further, the system 102 may combine the differenced stationary series data and the stationary series data in order to form the unified time series data.

For the unified time series data, the system 102 may plot a data distribution. The system 102 may validate the data distribution of the unified time series data based upon a rate function. The rate function may be associated with a Large Deviation Theory (LDT). Further, the system 102 may split the unified time series data into vectors based on an autocorrelation function (ACF). Each vector may comprise a set of values. For each vector, the system 102 may represent the data distribution of each vector into a mixture of Gaussian distribution models. The system 102 may further assign weights to each Gaussian distribution model using a Maximum Likelihood Estimation or Expectation Maximization (MLE/EM) algorithm. The weights may be assigned based on mean values of the Gaussian mixture models. The system 102 may generate a resultant Gaussian time series data. The resultant Gaussian time series data may be modified/varied by controlling the weights.

Although the present disclosure is explained by considering a scenario that the system 102 is implemented as an application on a server, it may be understood that the system 102 may also be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2, 104-3, and 104-N collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
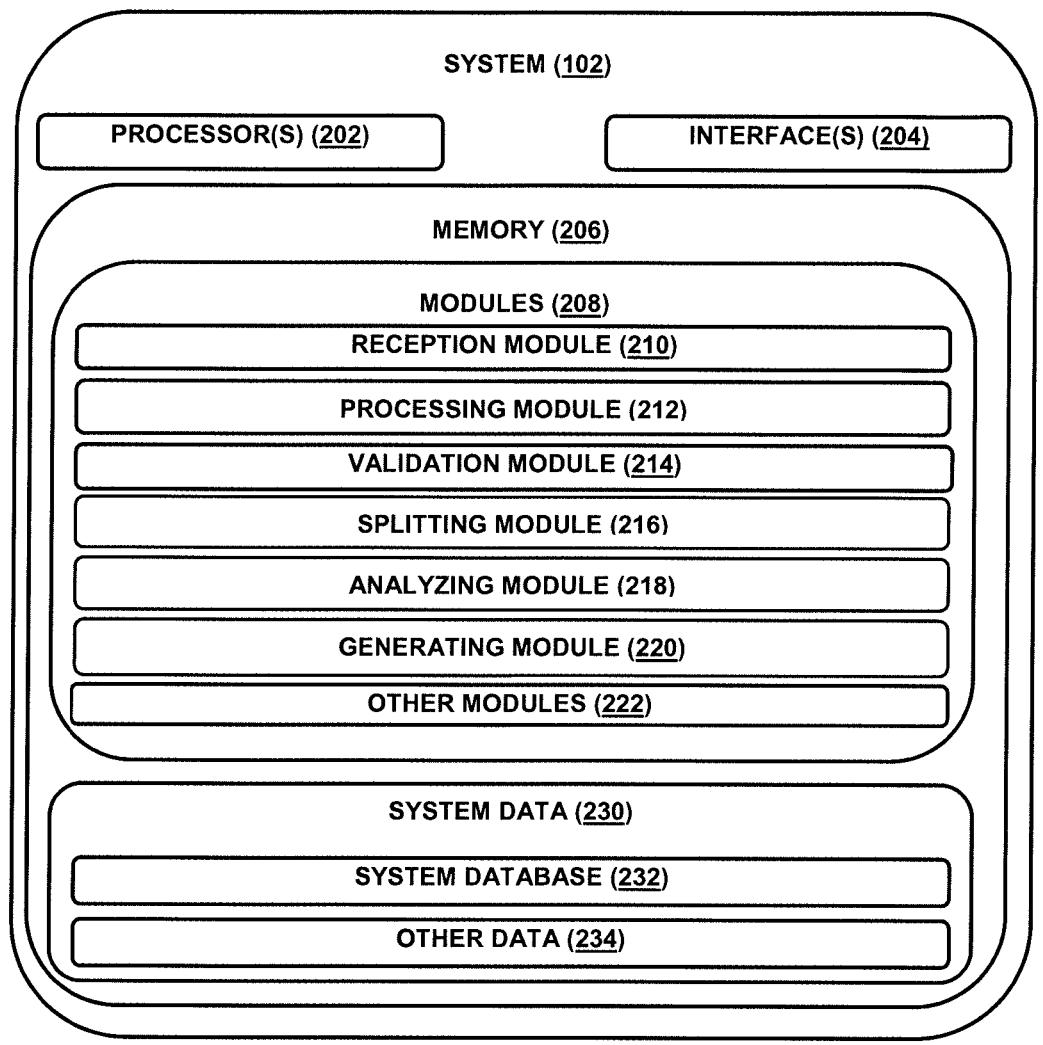
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or nonvolatile memory, such as read only memory (ROM), erasable programmable ROM, flash memories, hard disks, optical disks, and magnetic tapes. The memory 206 may include modules 208 and system data 230.

The modules 208 include routines, programs, objects, components, data structures, etc., which perform particular tasks or implement particular abstract data types. In one implementation, the modules 208 may include a reception module 210, a processing module 212, a validation module 214, a splitting module 216, an analyzing module 218, a generating module 220, and other modules 222. The other modules 222 may include programs or coded instructions that supplement applications and functions of the system 102.

The system data 230, amongst other things, serves as a repository for storing data processed, received, and generated by one or more of the modules 208. The system data 230 may also include a system database 232 and other data 234. The other data 234 may include data generated as a result of the execution of one or more modules in the other modules 222.

In one implementation, at first, a user may use the client device 104 to access the system 102 via the I/O interface 204. The working of the system 102 may be explained in detail using FIG. 2, FIG. 3, FIG. 4, FIG. 5A and FIG. 5B explained below. The system 102 may be used for forecasting a time series data. In order to forecast the time series data, the system 102 may receive a historical time series data. Specifically, the system 102 may employ the reception module 210 to receive the historical time series data. In one example, the system 102 may receive the historical time series data from a device (not shown) adapted/configured to record the time series data, for example a sensor device, financial data recorder etc. In one example, the historical time series data may comprise financial data of an organization at intervals of a week. In another example, the historical time series data may comprise weather data of a city, for example Mumbai, at intervals of a day or a month. In another example, the historical time series data may comprise daily stock prices for a given stock over a period of one year. In another example of the historical time series data may comprise time series data of sales volumes, interest rates, and/or quality measurements. Other examples of the historical time series data may comprise transactions, sales, inventory, man-hours, costs, revenue, savings, customers, product demand, traffic patterns and network usage. Further, the historical time series data may be received in several intervals. For example, the historical time series data may be received at the intervals of hours, days, weeks, months, quarters, years, or fiscal periods. In one implementation, the intervals may be fixed in length or the intervals may vary from period to period.

The historical time series data received using the reception module 210 may comprise a stationary series data and a non-stationary series data. The stationary time series may comprise values whose mean and variance remains constant over a period of time. In one example, yearly average of daily temperature readings in Mumbai may be considered as the stationary time series. Although temperature readings may vary from one day to another, the yearly averages may stay approximately the same. The non-stationary time series may comprise values whose mean and/or variance are not constant over a period of time. For example, electrical demand in Mumbai may have a long-term trend as the demand may increase in response to growing population. Therefore, the non-stationary series data indicates change in the mean and/or the variance of consecutive values of the historical time series data.

For processing the non-stationary series data, it may be difficult to model the time series data as the time series data is not stationary. Therefore, the non-stationary series data may have to be made stationary. In order to process the non-stationary series into the stationary series data, the system 102 may employ the processing module 212. In one implementation, the processing module 212 may process the stationary series data and the non-stationary series data to form a unified time series data. The processing module 212 may process the time series data by converting the non-stationary series data into a differenced stationary series data. In one implementation, the non-stationary series data may be converted by differencing the consecutive values of the non-stationary series data.

Figure 3:
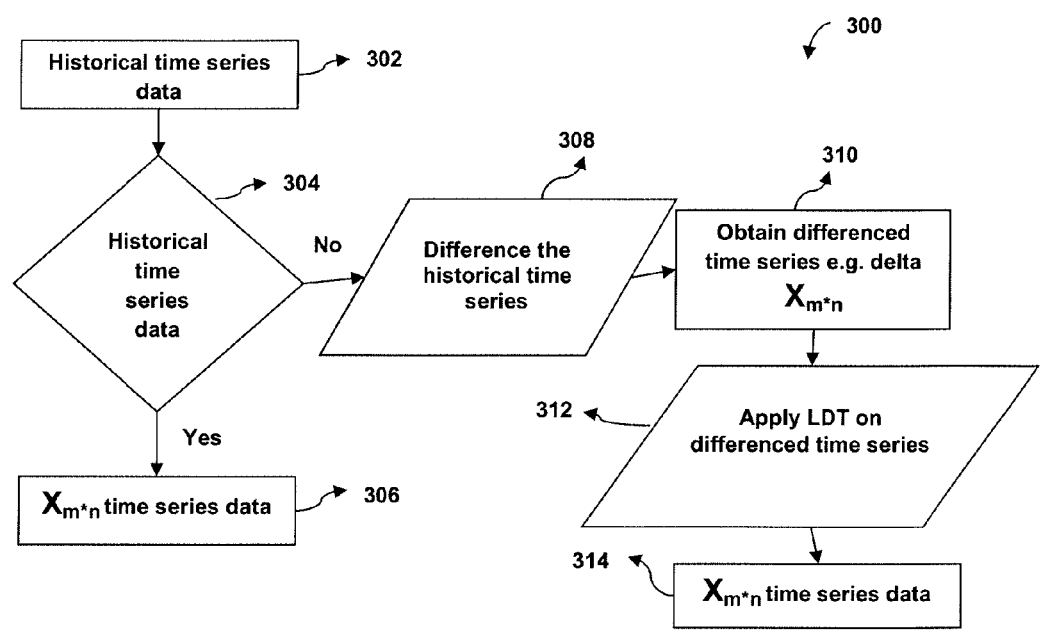
FIG. 3 illustrates a method for processing the stationary series data and the non-stationary series data, in accordance with an embodiment of the present disclosure.

The processing of the stationary series data and the non-stationary series data may be explained using the FIG. 3. For example, FIG. 3 illustrates a method 300 for processing the stationary series data and the non-stationary series data. At step/block 302, the historical time series data may be received. At decision step/block 304, the historical time series data may be checked to understand whether the historical time series data is stationary or not. The stationary of the historical time series data may be checked based on the mean and the variance of the historical time series data. If the historical time series data is stationary, the time series data i.e. $X_{m+n}$ may be used for further processing, as shown at step/block 306. At the decision step/block 304, if the historical time series data is determined that the series data is non-stationary series data, the non-stationary series data may be differenced as shown at step/block 308. The non-stationary series data may be converted into the stationary series data by obtaining the differenced time series data. The differenced time series data may be obtained by differencing the consecutive values of the non-stationary series data. For example, consider the values as $X_{m+n}$, the differenced time series data i.e. delta $X_{m+n}$ may be determined for the consecutive values in the series data as shown at step/block 310. Further, upon obtaining the differenced series data, LDT may be applied as shown at step/block 312 and the stationary series data i.e. differenced series data may be further processed as shown at step/block 314. Steps 312 and 314 will be explained in greater detail in the following description.

In order to understand the differencing the consecutive values of the non-stationary series data, Table 1 may be used as an example. Table 1 illustrates the historical time series data corresponding to finance data of an organization at the intervals of a week. In another example, the non-stationary series data may comprise weather forecast, day to day market risk, large insurance losses, extreme floods etc. From the Table 1, for the week $15^{th}$, it may be observed that the value is 0.05. Similarly, for the $16^{th}$, $17^{th}$ and $18^{th}$ week, it may be observed that the values are 0.15, 0.52 and 0.03 respectively.

TABLE 1

Table 1: Historical time series data and differenced series data

| Week | Historical Data Series | Differenced Series |
|---|---|---|
| 1 | 0.02 | |
| 2 | 0.05 | 0.035936 |

TABLE 1-continued

Table 1: Historical time series data and differenced series data

| Week | Historical Data Series | Differenced Series |
|---|---|---|
| 3 | 0.04 | −0.01239 |
| 4 | 0.44 | 0.39777 |
| 5 | 0.01 | −0.43123 |
| 6 | 0.02 | 0.009913 |
| 7 | 0.02 | 0.002478 |
| 8 | 0.02 | 0.001239 |
| 9 | 0.04 | 0.021066 |
| 10 | 0.03 | −0.00743 |
| 11 | 0.04 | 0.003717 |
| 12 | 0.04 | −0.00124 |
| 13 | 0.08 | 0.038414 |
| 14 | 0.08 | 0.006196 |
| 15 | 0.06 | −0.01735 |
| 16 | 0.15 | 0.086741 |
| 17 | 0.52 | 0.365551 |
| 18 | 0.03 | −0.48699 |
| 19 | 0.02 | −0.00496 |
| 20 | 0.07 | 0.043371 |
| 21 | 0.06 | −0.01115 |
| 22 | 0.07 | 0.013631 |
| 23 | 0.04 | −0.03222 |
| 24 | 0.07 | 0.027261 |
| 25 | 0.1 | 0.034696 |
| 26 | 0.13 | 0.030979 |
| 27 | 0.1 | −0.02726 |
| 28 | 0.11 | 0.006196 |
| 29 | 0.16 | 0.050805 |
| 30 | 0.99 | 0.830235 |
| 31 | 0.1 | −0.88724 |
| 32 | 0.06 | −0.04337 |
| 33 | 0.07 | 0.013631 |
| 34 | 0.07 | −0.00248 |
| 35 | 0.12 | 0.049566 |
| 36 | 0.1 | −0.02354 |
| 37 | 0.12 | 0.023544 |
| 38 | 0.07 | −0.04833 |
| 39 | 0.12 | 0.045849 |
| 40 | 0.12 | −0.00372 |
| 41 | 0.18 | 0.068154 |
| 42 | 0.22 | 0.032218 |
| 43 | 1 | 0.784387 |
| 44 | 0.07 | −0.93432 |
| 45 | 0.02 | −0.04337 |
| 46 | 0.07 | 0.048327 |
| 47 | 0.12 | 0.048327 |
| 48 | 0.14 | 0.019827 |
| 49 | 0.12 | −0.01859 |
| 50 | 0.16 | 0.042131 |
| 51 | 0.13 | −0.0285 |
| 52 | 0.18 | 0.047088 |
| 53 | 0.14 | −0.03594 |
| 54 | 0.12 | −0.0285 |
| 55 | 0.26 | 0.143742 |
| 56 | 0.95 | 0.686493 |
| 57 | 0.1 | −0.84758 |
| 58 | 0.08 | −0.02354 |
| 59 | 0.12 | 0.045849 |
| 60 | 0.11 | −0.00991 |
| 61 | 0.12 | 0.006196 |
| 62 | 0.12 | 0 |
| 63 | 0.11 | −0.00991 |
| 64 | 0.13 | 0.021066 |
| 65 | 0.18 | 0.052045 |
| 66 | 0.09 | −0.09542 |
| 67 | 0.12 | 0.033457 |
| 68 | 0.12 | 0.002478 |
| 69 | 0.68 | 0.562577 |
| 70 | 0.06 | −0.62577 |
| 71 | 0.06 | −0.00248 |
| 72 | 0.04 | −0.01239 |
| 73 | 0.09 | 0.04461 |
| 74 | 0.12 | 0.028501 |
| 75 | 0.06 | −0.05576 |
| 76 | 0.07 | 0.009913 |
| 77 | 0.08 | 0.009913 |
| 78 | 0.15 | 0.066915 |
| 79 | 0.08 | −0.0632 |

For the time series data that is not-stationary, the difference between the consecutive values may be calculated. For the non-stationary data as shown in Table 1, for the weeks 16, 17 and 18, the difference between their consecutive values i.e. difference of their previous values and the current values may be determined and presented. It may be observed from the Table 1, the differenced series data for the weeks 16, 17 and 18, the difference between consecutive values is 0.086741, 0.365551, and −0.48699 respectively. Similarly, for the remaining values corresponding to the weeks in the non-stationary series data may be differenced and may be presented. The differenced series data obtained after determining the difference between consecutive values, the differenced series data may be assumed that the series data is stationary. In order to process the time series data, the differenced stationary series data and the stationary series data may be combined to form the unified time series data. In one implementation, the system 102 may employ the processing module 212 to combine the differenced stationary series data and the stationary series data to form the unified time series data. The nature/pattern of the time series of the unified time series data obtained upon processing the time series data may be stationary.

After obtaining the unified time series data, the unified time series data may need to be validated in order to check whether or not the series data is stationary. In order to verify/check the stationary of the time series data, the system 102 may employ the validation module 214. The validation module 214 may plot a data distribution on the unified time series data. After plotting the data distribution on the unified time series data, the data distribution of the unified time series data may be validated. In one implementation, the validation module 214 may validate the data distribution of the unified time series data based upon a rate function. The rate function may be associated with a Large Deviation Theory (LDT).

Figure 5A:
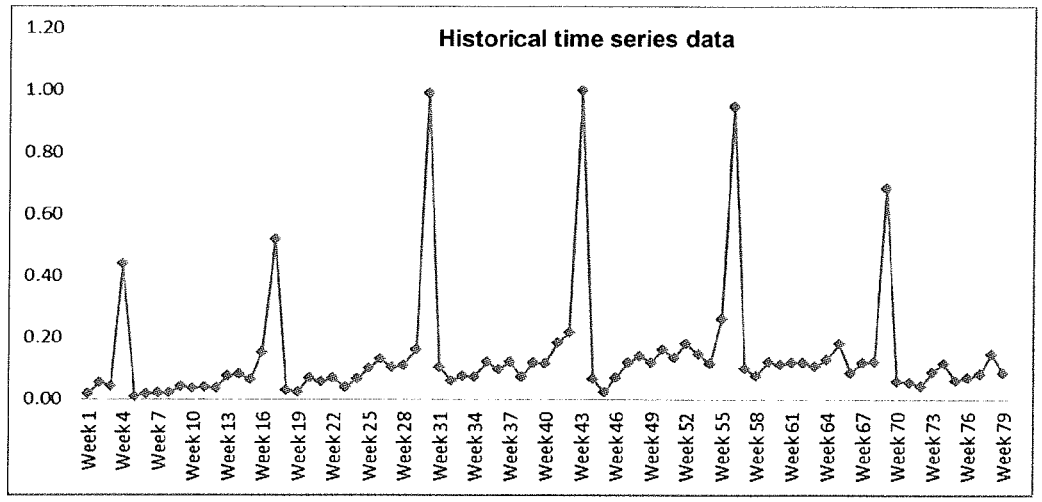
FIG. 5A and FIG. 5B illustrate the historical time series data and forecasted time series data based on the historical time series data respectively, in accordance with an embodiment of the present disclosure.

In order to understand the validation and the subsequent implementation, FIG. 5A may be used as an example. FIG. 5A illustrates the pattern of the unified time series data. As illustrated in the FIG. 5A, the rate function may be determined based on behaviour of the values lying in the tails/extreme of the data distribution. In one implementation, the rate function for the behaviour of the values lying in the tails/extreme of the data distribution may be determined based on the increase in number of the values in sample space/observations. In one implementation, the rate function may be defined using the LDT. Further, the LDT may be used to validate a rate of change for the unified time series data. The LDT may be used to have an average rate of change near to the rate function based on the number of observations/values.

Upon validating the data distribution of the unified time series data, the system 102 may employ the splitting module 216 to split the unified time series data into vectors/slots. In one implementation, the splitting module 216 may split the unified time series data into vectors/slots based on the Autocorrelation Function (ACF). Each vector may comprise a set of values. Referring to Table 1 and FIG. 5A, it may be observed that in the unified time series data, the ACF may show spike/sudden increase/raise in the values at intervals of 13 weeks. In one example, it may be observed that the values spike/sudden increase/raise at $17^{th}$ week and $30^{th}$ week. Based on the ACF, the unified time series may be split/broken down into vectors/slots at the intervals of 13 (weeks). For each vector, we may have 'n' number of time series with a size of 13 as the ACF spike/raises at 13 weeks.

After splitting/breaking down the unified time series data into vectors, the data distribution of each vector may be represented into a mixture of Gaussian distribution models. In one implementation, the system 102 may employ the analyzing module 218 for representing each vector. For the unified time series data, it may be required to identify a Data Generating Process (DGP). In order to identify the DGP, the system 102 may use the mixture of Gaussian distribution models. In other words, the DGP is represented by adding/summing different Gaussian distribution models. For representing the DGP of the unified time series data, the mixture of Gaussian distribution models may be specified. In order to predict/forecast accurate time series data, each Gaussian distribution models may be assigned with a weight. The weights may be assigned to forecast/predict different what-if scenarios. In one implementation, the system 102 may employ the analyzing module 218 to assign weights to each Gaussian distribution model. The weights may be assigned using a Maximum Likelihood Estimation or Expectation Maximization (MLE/EM) algorithm that may be known in the art. In one implementation, the weights may be assigned based on mean values of the Gaussian mixture models.

Figure 4:
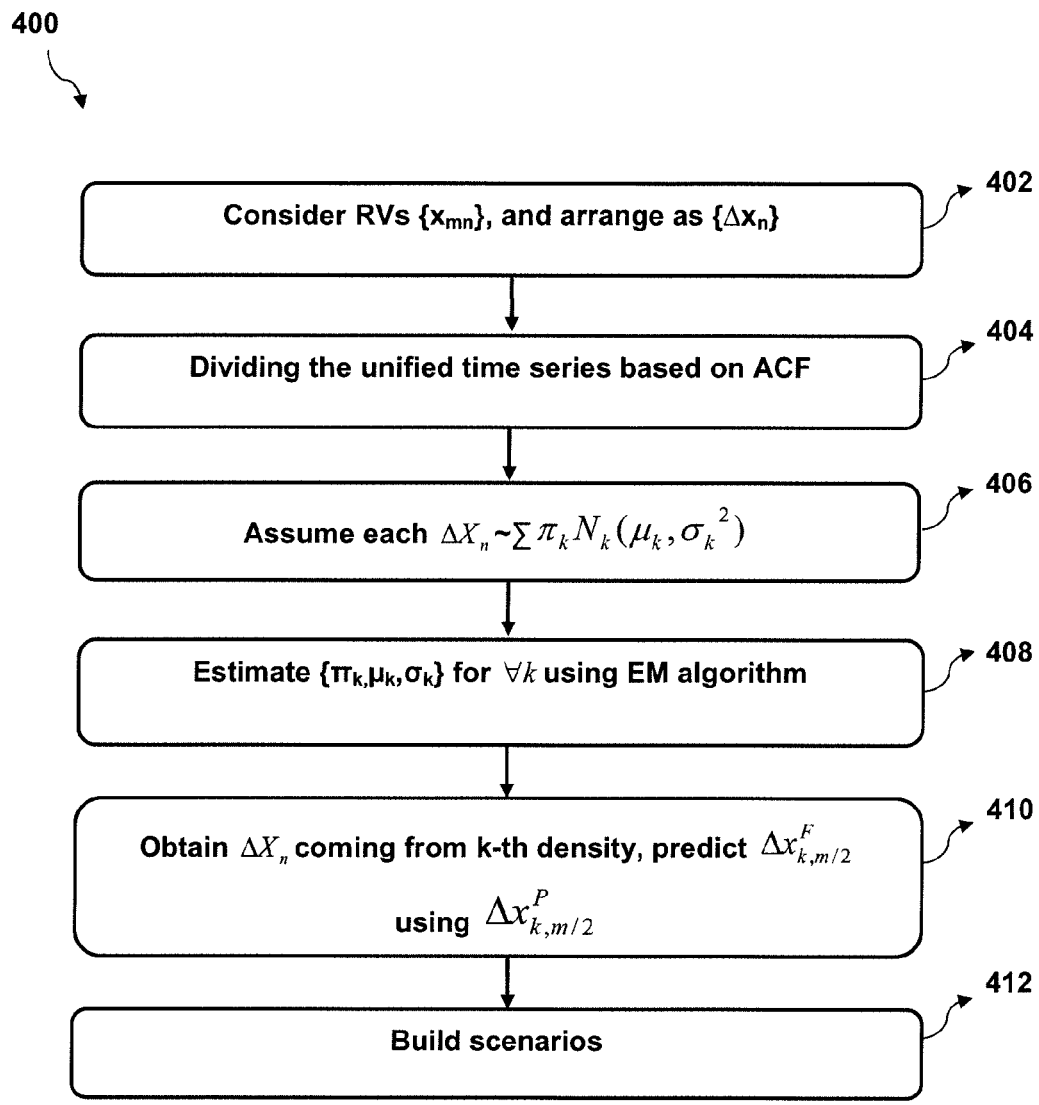
FIG. 4 illustrates a method for implementing the mixture of the Gaussian distribution models, in accordance with an embodiment of the present disclosure.

In order to understand implementation of the mixture of the Gaussian distribution models, FIG. 4 may be used as an example. FIG. 4 illustrates a method 400 for implementing the mixture of the Gaussian distribution models. At first, Random Variables (RVs) $\{x_{mn}\}$ may be considered which may be arranged as as $\{\Delta X_n\}$, shown at step 402. The RVs $\{x_n\}$ may be time dependent and may be expressed as Autoregressive (AR) process, i.e. AR(p,q). As AR(p,q) may be expressed as Value at Risk/variance, VAR(1,1), $x_t$ may depend only on $x_{t-1}$. Therefore, the time dependency may be reduced to Markov process. The Markov process may be implemented as may be known in the art. Each $\Delta X_i$, i∈n may be a vector of dimension m after differencing $(X_n - X_{n-1})$. In general, length of m may be determined by considering ACF of $\{x_{mn}\}$. The unified time series data may be divided based on Autocorrelation Function, ACF=1/2e heuristic as shown at step 404. In one implementation, any known heuristics may also be employed to group the RVs based on the ACF/PACF (Partial Autocorrelation Function). At step 306, it may be assumed that each $\Delta X_n \sim \Sigma \pi_k N_k(\mu_k, \sigma_k^2)$ where k=1 . . . K. At step 408, $\{\pi_k, \mu_k, \sigma_k\}$ may be estimated for $\forall$k using the EM algorithm, K is the number of mixture components and N is number of observations, μ is mean, σ is variance, and Σ is covariance matrices. Further, a trained algorithm may be employed as used by Eiroli and Lendasse (1991), to yield $\Delta X_n$ coming/deriving from k-th density is $$\begin{bmatrix} \Delta x_{k,m/2}^P \\ \Delta x_{k,m/2}^F \end{bmatrix} = \begin{bmatrix} \mu_k^P \\ \mu_k^F \end{bmatrix} + \begin{bmatrix} \Sigma_k^{PP} & \Sigma_k^{PF} \\ \Sigma_k^{FP} & \Sigma_k^{FF} \end{bmatrix} \cdot \Delta x_{k,m/2}^P$$

indicates the unified time series data used to predict future values in the time series data, i.e. $\Delta x_{k,m/2}^F$ as shown at step 410. P may indicate past/historical/unified time series data values and F may refer the future values. In one implementation, for conditional prediction of the future values, expected/resultant/future times series data comprising values given the past values for k-th mixture may be calculated using $\Delta \tilde{x}_{k,m/2}^F = \mu_k^F + \Sigma_k^{FP}(\Sigma_k^{PP})^{-1}(x_{k,m/2}^P - \mu_k^P)$. At step 412, in order to build scenarios, $$p(x \in (x_{m/2} + \Delta x_{m/2})) = p(x = \Delta x_{m/2}) \approx \sum_{k=1}^{K} \pi_k e^{-n\phi l_k(x)}$$

may be used, where Φ is kth dimensional vector/mixture weight.

As described above, for representing the DGP of the unified time series data, the mixture of Gaussian distribution models may be specified. Consider, the DGP may be M, and M is represented as a mixture of two Gaussian distribution models, e.g. G1 and G2. Further, consider the weights w1 and w2 are assigned to G1 and G2 respectively. Therefore, the DGP of M may be presented as:

$M = w_1 G_1 + w_2 G_2$

For the above example, w1 and w2 may be the weights that may be optimal and may be obtained using the Maximum Likelihood Estimation or Expectation Maximization Algorithm (EM Algorithm). After obtaining the weights, the weights may be increased or decreased to create different scenarios with different weights attached/assigned to each of the Gaussian Distributions. The controlling of the weights may help to create different 'what-if scenarios'. The controlling/modifying/tweaking of the weights may help in achieving a probabilistic forecasting. In other words, the controlling/modifying/tweaking of the weights enables to generate a resultant Gaussian time series data. The resultant Gaussian time series data is modified/varied by controlling the weights. In one implementation, the system 102 may employ the generating module 220 to generate the resultant Gaussian time series data. The manipulating/controlling/modifying/tweaking of the weights help to understand how proportions of each Gaussian distribution impacts the output that would be generated. The resultant Gaussian time series data indicates forecasted time series data of the historical time series data. The resultant Gaussian time series data may be forecasted using the rate of change of a series, thereby avoiding re-parameterization. The rate of change of the series may be used to forecast the time series data based on the historical time series data or using an average of few data values e.g. 6 values. To forecast the next/subsequent value in the time series data, the previous value may be added to the forecasted value of the rate of change series.

In one implementation, if first order integrated series is employed, the forecasted values of the time series data may provide the probability that the time series data values increased by $\Delta x_i$. In another implementation, if the conditional expectations between $\Delta x_i$ and $\Delta x_{i-1}$ are considered, then for different $\Delta x_i$ the scenarios may be created and forecasted values may be obtained for the time series data.

Figure 5B:
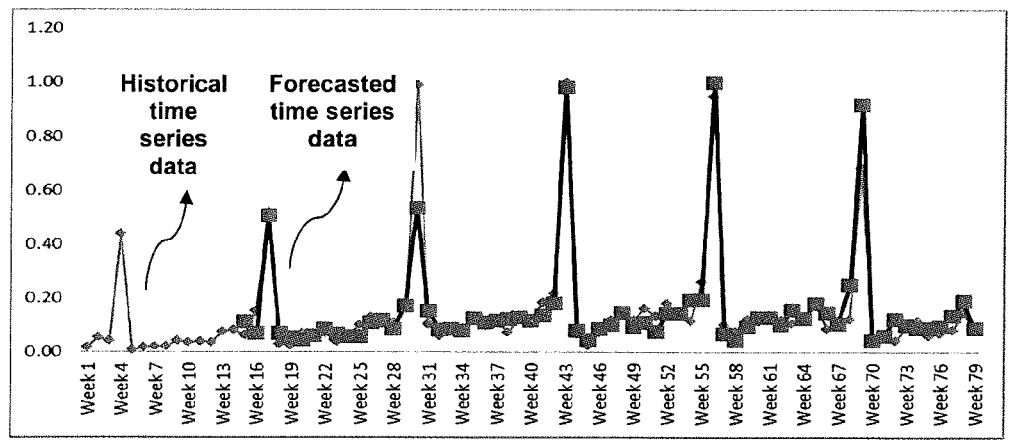

In one example, FIG. 5B and Table 2 may be used as an example to illustrate the forecasted time series data for the data illustrated using the Table 1 and FIG. 5A. Table 2 shows the forecasted time series data with respect to the historical time series data. Further, Mean Absolute Percentage Error (MAPE) for the corresponding values in historical time series data and the forecasted time series data may be calculated as shown in Table 2.

TABLE 2

Table 2: Historical time series data and the forecasted time series data

| Week | Historical | Forecast | MAPE |
|---|---|---|---|
| 1 | 0.02 | | |
| 2 | 0.05 | | |
| 3 | 0.04 | | |
| 4 | 0.44 | | |
| 5 | 0.01 | | |
| 6 | 0.02 | | |
| 7 | 0.02 | | |
| 8 | 0.02 | | |
| 9 | 0.04 | | |
| 10 | 0.03 | | |
| 11 | 0.04 | | |
| 12 | 0.04 | | |
| 13 | 0.08 | | |
| 14 | 0.08 | | |
| 15 | 0.06 | 0.11 | 76% |
| 16 | 0.15 | 0.07 | 53% |
| 17 | 0.52 | 0.50 | 2% |
| 18 | 0.03 | 0.07 | 136% |
| 19 | 0.02 | 0.05 | 119% |
| 20 | 0.07 | 0.05 | 32% |
| 21 | 0.06 | 0.06 | 8% |
| 22 | 0.07 | 0.08 | 20% |
| 23 | 0.04 | 0.07 | 77% |
| 24 | 0.07 | 0.06 | 13% |
| 25 | 0.10 | 0.06 | 42% |
| 26 | 0.13 | 0.11 | 16% |
| 27 | 0.10 | 0.12 | 13% |
| 28 | 0.11 | 0.09 | 22% |
| 29 | 0.16 | 0.17 | 6% |
| 30 | 0.99 | 0.53 | 46% |
| 31 | 0.10 | 0.15 | 46% |
| 32 | 0.06 | 0.08 | 35% |
| 33 | 0.07 | 0.08 | 13% |
| 34 | 0.07 | 0.08 | 11% |
| 35 | 0.12 | 0.13 | 4% |
| 36 | 0.10 | 0.11 | 12% |
| 37 | 0.12 | 0.12 | 5% |
| 38 | 0.07 | 0.12 | 65% |
| 39 | 0.12 | 0.13 | 8% |
| 40 | 0.12 | 0.11 | 0% |
| 41 | 0.18 | 0.13 | 26% |
| 42 | 0.22 | 0.18 | 16% |
| 43 | 1.00 | 0.98 | 2% |
| 44 | 0.07 | 0.08 | 20% |
| 45 | 0.02 | 0.05 | 102% |
| 46 | 0.07 | 0.08 | 20% |
| 47 | 0.12 | 0.10 | 16% |
| 48 | 0.14 | 0.15 | 5% |
| 49 | 0.12 | 0.09 | 21% |
| 50 | 0.16 | 0.11 | 33% |
| 51 | 0.13 | 0.08 | 43% |
| 52 | 0.18 | 0.14 | 20% |
| 53 | 0.14 | 0.14 | 1% |
| 54 | 0.12 | 0.19 | 66% |
| 55 | 0.26 | 0.19 | 25% |
| 56 | 0.95 | 1.00 | 6% |
| 57 | 0.10 | 0.07 | 32% |
| 58 | 0.08 | 0.04 | 44% |
| 59 | 0.12 | 0.09 | 23% |
| 60 | 0.11 | 0.13 | 16% |
| 61 | 0.12 | 0.13 | 7% |
| 62 | 0.12 | 0.10 | 14% |
| 63 | 0.11 | 0.16 | 44% |
| 64 | 0.13 | 0.13 | 3% |
| 65 | 0.18 | 0.18 | 0% |
| 66 | 0.09 | 0.15 | 72% |
| 67 | 0.12 | 0.10 | 14% |
| 68 | 0.12 | 0.25 | 107% |
| 69 | 0.68 | 0.92 | 34% |
| 70 | 0.06 | 0.04 | 30% |
| 71 | 0.06 | 0.06 | 7% |
| 72 | 0.04 | 0.12 | 180% |
| 73 | 0.09 | 0.10 | 14% |
| 74 | 0.12 | 0.09 | 24% |
| 75 | 0.06 | 0.09 | 44% |
| 76 | 0.07 | 0.09 | 33% |
| 77 | 0.08 | 0.13 | 65% |
| 78 | 0.15 | 0.19 | 28% |
| 79 | 0.08 | 0.09 | 6% |

Figure 6:
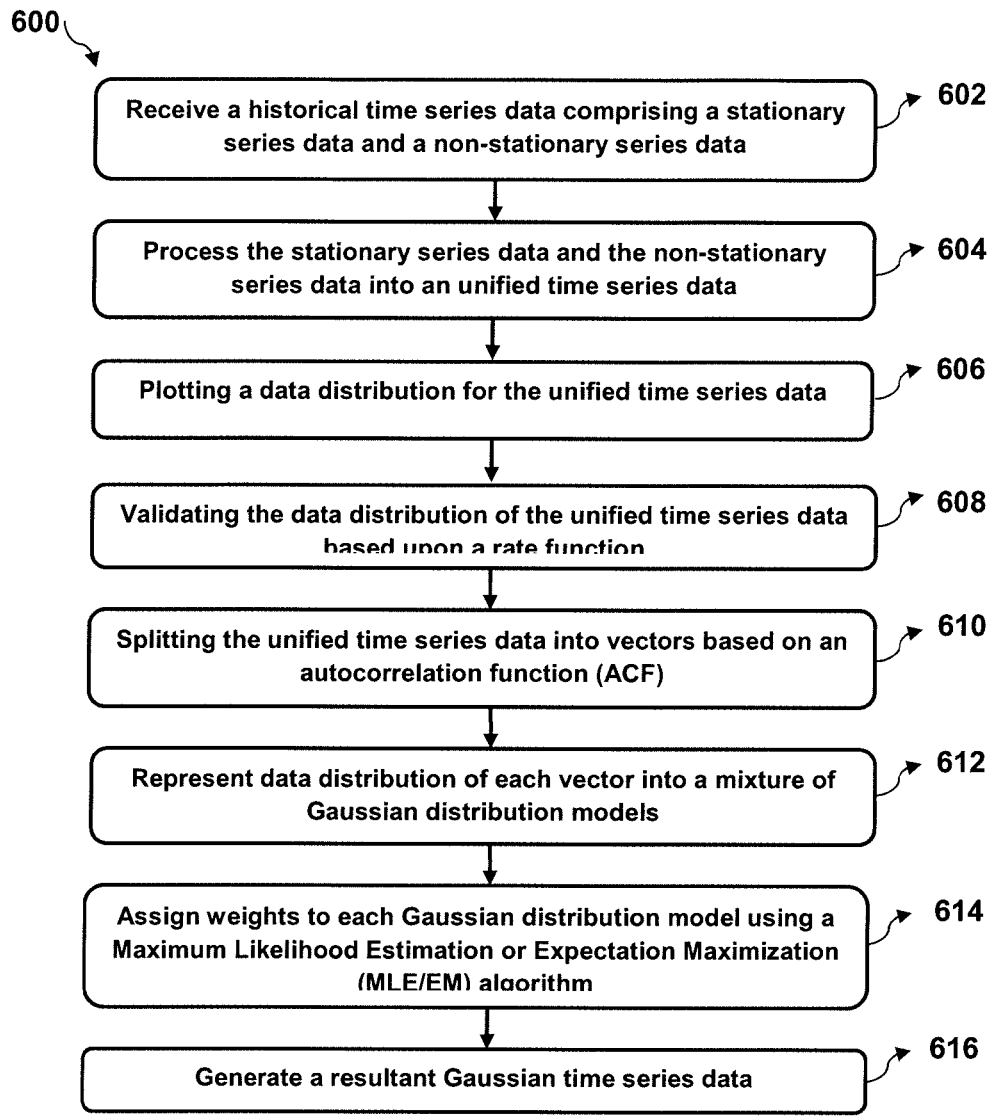
FIG. 6 illustrates a method for forecasting a time series data, in accordance with an embodiment of the present disclosure.

Referring now to FIG. 6, a method 600 for forecasting a time series data is shown, in accordance with an embodiment of the present disclosure. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 600 is described and is not intended to be construed as a limitation, and any number of the described method blocks can be combined in any order to implement the method 600 or alternate methods. Additionally, individual blocks may be deleted from the method 600 without departing from the spirit and scope of the disclosure described herein. Furthermore, the method may be implemented in any suitable hardware, software, firmware, or combination thereof. However, for ease of explanation, in the embodiments described below, the method 600 may be implemented in the above-described system 102.

At step/block 602, a historical time series data may be received. The historical time series data may comprise a stationary series data and a non-stationary series data. The non-stationary series data indicate change in a mean and a variance of consecutive values of the historical time series data. In one implementation, the historical time series data may be received by the reception module 210.

At step/block 604, the stationary series data and the non-stationary series data may be processed to form a unified time series data. The processing may comprise converting the non-stationary series data into a differenced stationary series data. The non-stationary, series data may be converted by differencing the consecutive values of the non-stationary series data. The processing may further comprise combining the differenced stationary series data and the stationary series data in order to form the unified time series data. In one implementation, the stationary series data and the non-stationary series data may be processed by the processing module 212.

At step/block 606, a data distribution may be plotted for the unified time series data. In one implementation, the data distribution may be plotted by the validation module 214.

At step/block 608, the data distribution of the unified time series data may be validated based upon a rate function. The rate function may be associated with a Large Deviation Theory (LDT). In one implementation, the data distribution may be validated by the validation module 214.

At step/block 608, the unified time series data may be split into vectors based on an autocorrelation function (ACF), wherein each vector comprises a set of values. In one implementation, the unified time series data may be split by the splitting module 216.

At step/block 610, the data distribution of each vector may be represented into a mixture of Gaussian distribution models. In one implementation, the data distribution of each vector may be represented by the analyzing module 218.

At step/block 612, weights may be assigned to each Gaussian distribution model using a Maximum Likelihood Estimation or Expectation Maximization (MLE/EM) algorithm. The weights may be assigned based on mean values of the Gaussian mixture models. In one implementation, the weights may be assigned by the analyzing module 218.

At step/block 614, a resultant Gaussian time series data may be generated. The resultant Gaussian time series data may be modified/varied by controlling the weights. The resultant Gaussian time series data indicates forecasted time series data of the historical time series data. In one implementation, the resultant Gaussian time series data may be generated by the generating module 220.

Although implementations of system and method for forecasting a time series data have been described in language specific to structural features and/or methods, it is to be understood that the appended claims are not necessarily limited to the specific features or methods described. Rather, the specific features and methods are disclosed as examples of implementations for forecasting a time series data, and any and all such equivalent embodiments and examples are within the scope of the present invention and are intended to be covered by the appended claims.

We claim:

1. A method for forecasting a time series data, the method comprising:

receiving, by a processor, a historical time series data comprising a stationary series data and a non-stationary series data, wherein the non-stationary series data indicate change in a mean and a variance of consecutive values of the historical time series data;

processing, by the processor, the stationary series data and the non-stationary series data to form a unified time series data, wherein the processing comprises
converting the non-stationary series data into a differenced stationary series data, wherein the non-stationary series data is converted by differencing the consecutive values of the non-stationary series data, and
combining the differenced stationary series data and the stationary series data in order to form the unified time series data;

plotting, by the processor, a data distribution for the unified time series data;

validating, by the processor, the data distribution of the unified time series data based upon a rate function, wherein the rate function is associated with a Large Deviation Theory (LDT);

splitting, by the processor, the unified time series data into vectors based on an autocorrelation function (ACF), wherein each vector comprises a set of values;

representing, by the processor, data distribution of each vector into a mixture of Gaussian distribution models;

assigning, by the processor, weights to each Gaussian distribution model using a Maximum Likelihood Estimation or Expectation Maximization (MLE/EM) algorithm, wherein the weights are assigned based on mean values of the Gaussian mixture models; and generating, by the processor, a resultant Gaussian time series data, wherein the resultant Gaussian time series data is modified/varied by controlling the weights, and wherein the resultant Gaussian time series data indicates forecasted time series data of the historical time series data.

2. The method of claim 1, wherein the LDT defines the rate function for the data distribution based on behavior of the values present in the unified time series data, wherein the behavior is determined using extreme values in the unified time series data.

3. The method of claim 1, wherein the validation further comprises checking a rate of change of the unified time series data with the rate function.

4. A system for forecasting a time series data, the system comprising:

a processor; and a memory coupled to the processor, wherein the processor executes a plurality of modules stored in the memory, and wherein the plurality of modules comprise:

a reception module to receive a historical time series data comprising a stationary series data and a non-stationary series data, wherein the non-stationary series data indicate change in a mean and a variance of consecutive values of the historical time series data;

a processing module to process the stationary series data and the non-stationary series data to form a unified time series data, wherein the processing module further:
converts the non-stationary series data into a differenced stationary series data, wherein the non-stationary series data is converted by differencing the consecutive values of the non-stationary series data, and
combines the differenced stationary series data and the stationary series data in order to form the unified time series data;

a validation module to:
plot a data distribution for the unified time series data; and
validate the data distribution of the unified time series data based upon a rate function, wherein the rate function is associated with a Large Deviation Theory (LDT);

a splitting module to split the unified time series data into vectors based on an autocorrelation function (ACF), wherein each vector comprises a set of values;

an analyzing module to:
represent the data distribution of each vector into a mixture of Gaussian distribution models;
assign weights to each Gaussian distribution model using a Maximum Likelihood Estimation or Expectation Maximization (MLE/EM) algorithm, wherein the weights are assigned based on mean values of the Gaussian mixture models; and a generating module to generate a resultant Gaussian time series data, wherein the resultant Gaussian time series data is modified/varied by controlling the weights, and wherein the resultant Gaussian time series data indicates forecasted time series data of the historical time series data.

5. The system of claim 4, wherein the LDT defines the rate function for the data distribution based on behavior of the values present in the unified time series data, wherein behavior is determined using extreme values (tails) in the unified time series data.

6. The system of claim 4, wherein the validation module further checks a rate of change of the unified time series data with the rate function.

7. A non-transitory computer readable medium embodying a program executable in a computing device for forecasting a time series data, the program comprising:
- a program code for receiving a historical time series data comprising a stationary series data and a non-stationary series data, wherein the non-stationary series data indicate change in a mean and a variance of consecutive values of the historical time series data;
- a program code for processing the stationary series data and the non-stationary series data to form a unified time series data, wherein the processing comprises
  - a program code for converting the non-stationary series data into a differenced stationary series data, wherein the non-stationary series data is converted by differencing the consecutive values of the non-stationary series data, and
  - a program code for combining the differenced stationary series data and the stationary series data in order to form the unified time series data;
- a program code for plotting a data distribution for the unified time series data;
- a program code for validating the data distribution of the unified time series data based upon a rate function, wherein the rate function is associated with a Large Deviation Theory (LDT);
- a program code for splitting the unified time series data into vectors based on an autocorrelation function (ACF), wherein each vector comprises a set of values;
- a program code for representing data distribution of each vector into a mixture of Gaussian distribution models;
- a program code for assigning weights to each Gaussian distribution model using a Maximum Likelihood Estimation or Expectation Maximization (MLE/EM) algorithm, wherein the weights are assigned based on mean values of the Gaussian mixture models; and
- a program code for generating a resultant Gaussian time series data, wherein the resultant Gaussian time series data is modified/varied by controlling the weights, and wherein the resultant Gaussian time series data indicates forecasted time series data of the historical time series data.

* * * * *